Figure 1:
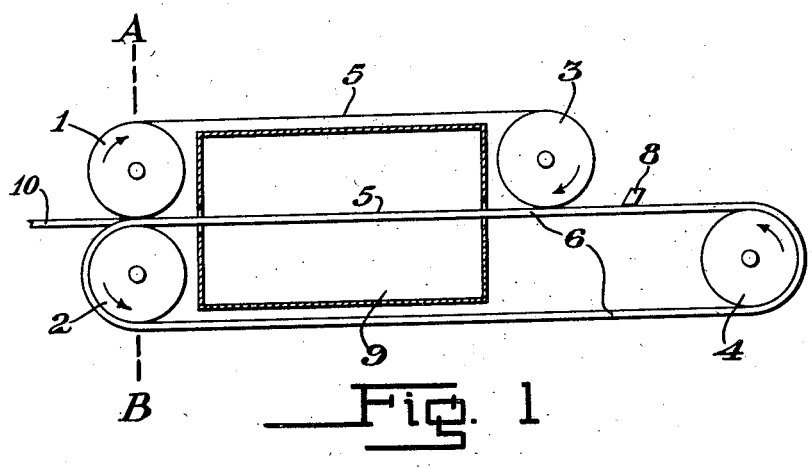

March 14, 1950     E. G. WILLIAMS     2,500,728
PRODUCTION OF POLYMERIC RESIN SHEETS BY CONTINUOUSLY
POLYMERIZING MONOMERIC MATERIAL
Filed June 11, 1945

*Edmund George Williams*    INVENTOR.

BY

*Frank C. Hilberg*    ATTORNEY

Patented Mar. 14, 1950

UNITED STATES PATENT OFFICE 2,500,728

PRODUCTION OF POLYMERIC RESIN SHEETS BY CONTINUOUSLY POLYMERIZING MONOMERIC MATERIAL

Edmond George Williams, Lemsford, England, assignor to Imperial Chemical Industries Limited, a corporation of Great Britain Application June 11, 1945, Serial No. 598,689
In Great Britain December 17, 1943

Section 1, Public Law 690, August 8, 1946
Patent expires December 17, 1963

8 Claims. (Cl. 18—58)

This invention relates to an improved process for the production of sheets of polymeric resin.

By the term "polymeric resin" I mean any material produced by polymerisation of one or more polymerisable unsaturated organic compounds each possessing a formula containing the group $CH_2=C<$. Such unsaturated organic compounds are referred to as monomeric compounds throughout this specification.

The production of sheets of polymeric resin by compression moulding of the polymeric substance in powder form is well-known. Sheet material so produced is not suitable for subsequent shaping as internal stresses are set up during the moulding operation which may lead to undesirable distortion of the sheet when heated for the shaping operation. Considerable limitation is also imposed on the possible size of such sheets.

A method of manufacture of sheets of polymeric resin has been disclosed in British specification No. 450,305 in which unsaturated organic compounds having one or more double bonds are polymerised in flat chambers, the flat side walls of which are substantially rigid but capable of relative movement to compensate for the diminution of volume of the material undergoing treatment. After polymerisation, the assembly is immersed in water and the sheets separated from the walls of the chamber. The size of the sheets which may be produced by this method is restricted by the difficulty of handling large polymerization chambers. Furthermore, the labour costs are high as a result of the considerable amount of manual work required during assembly of the chambers, filling operations and subsequent stripping of the sheets of polymeric material from the walls of the chambers.

It is an object of the present invention to provide a method for the production of sheets of polymeric materials free from many of the disadvantages and limitations of the prior art. Thus it is an object of the present invention to provide a process for the production of large sheets or plates of polymeric material substantially free from internal stresses and substantially free from internal voids. It is a further object to provide a process whereby transparent sheets may be produced at a lower cost than has hitherto been the case. Other objects will appear hereinafter.

According to the present invention sheets or plates comprising a polymeric resin are produced by a process wherein a liquid or paste containing one or more monomeric compounds is passed between moving surfaces which are substantially parallel in the direction of the movement and have substantially no relative motion, and the monomeric constituents of said liquid or paste are polymerised between said surfaces by the action of heat and/or light with or without the application of pressure.

The liquids which may be employed include monomeric compounds in the liquid state, preferably when at normal atmospheric pressure, partially polymerised monomeric compounds and solutions of soluble polymeric resins in monomeric compounds. The pastes which may be employed include mixtures of liquid monomeric and solid polymeric organic compounds which are at least partially soluble in the monomeric compounds. Monomeric compounds which are gaseous at normal atmospheric pressure, such as vinyl chloride, are not satisfactory for use in this invention because of the costly pressure equipment which would be required to carry out the invention. Monomeric compounds which are in the liquid state at normal atmospheric pressure may contain one $CH_2=C<$ group per molecule, for example, methyl methacrylate, butyl methacrylate, styrene and vinyl acetate, or more than one $CH_2=C<$ group per molecule, for example, glycol dimethacrylate, allyl methacrylate, diallyl oxalate and the compounds described in British application No. 11,052/44. Monomeric compounds which contain more than one $CH_2=C<$ group per molecule when polymerised alone, or in the presence of a compound containing one $CH_2=C<$ group per molecule and which is not an overwhelmingly major component of the mixture, e. g. say not more than 95%, first form viscous liquids, then gels which have only a small solubility in monomers and then insoluble solid polymeric resins. Thus not all partially polymerised or fully polymerised monomeric compounds are suitable for use in this invention particularly when the monomers contain more than one $CH_2=C<$ groups per molecule.

The liquids and pastes for use in this invention may also contain plasticizers, such as tricresyl phosphate or dibutyl phthalate; fillers; reinforcing materials such as fabric; dyes and pigments, providing that these materials do not prevent the polymerisation of the monomeric compounds contained in these mixtures.

The liquid or paste may be conveyed to the moving surfaces continuously, for example, from a drawing-off cock at the bottom of a stirred vat or may be applied intermittently. To produce a uniform sheet it is desirable to supply the liquid or paste to the moving surfaces at such a rate that there is always a surplus of material at the point at which it enters the space between the moving surfaces.

When monomeric compounds are polymerised by the action of heat the said moving surfaces may be opaque, for example, fabricated from a metal such as steel. When this polymerisation is by the action of light rays one of the moving surfaces must be translucent and may be fabricated from a regenerated cellulose foil such as "Cellophane" (registered trade-mark). When one or both of these moving surfaces is composed of "Cellophane" (registered trade-mark), it is often desirable not to remove this "Cellophane" (registered trade-mark) from the sheets of polymeric resin until they are utilised in order to prevent their surfaces being scratched during the interim period after their production and before their fabrication into articles.

When heat polymerisation is used the required temperature can be obtained by passing the moving surfaces through a steam or electrically heated chamber, between banks of radiant heaters, between heated rollers, between the heated track elements described in British application No. 11,513/44, or by using the moving surfaces as electrodes for high frequency electrical heating as described in British application No. 4,795/44. When light polymerisation is used a very satisfactory source of light is obtained with mercury vapour lamps.

A polymerisation catalyst may be incorporated in the liquid or pastes of this invention. This results in an increase in the rate of polymerisation at a given temperature and the greater rate of polymerisation the lower the molecular weight of the polymer produced. Suitable heat polymerisation catalysts are peroxides such as benzoyl and acetyl peroxides. Suitable light polymerisation catalysts are benzoin, diacetyl and uranyl acetate and nitrate.

It is preferred that the moving surfaces be continuously moving surfaces. When continuously moving surfaces are used some means for cleaning these surfaces after the sheets or plates have been removed from them and before they are reused is normally necessary. The present invention is, however, not limited in this respect and the process may also be carried out employing intermittently moving surfaces.

Stripping agents, for example, cationic wetting agents, may be applied to the moving surfaces to facilitate their separation from the polymerised sheet.

It will be apparent that the motion of the moving surfaces while remaining substantially parallel may, with advantage, be so arranged that the surfaces are brought slightly closer together in passing through the region in which polymerisation is taking place. In this way it is possible to "follow-up" the shrinkage of the polymerising mass. Such deviations from truly parallel motion, being dependent upon the change in volume of the mass polymerised, will be small and are within the scope of this invention.

"Follow-up" pressure may be applied to the polymerising material by any means known in the art. Thus, for example, the moving surfaces, with a continuous layer of the material between, may be passed between a plurality of spring loaded rollers arranged in pairs, each moving surface being in contact with one member of each pair, or pressure may be applied by means of the method described in British application No. 11,513/44. It is preferred that these pressure members or supports are applied to the moving surfaces in such a way that the surfaces are substantially plane.

For the production of plane transparent sheets, a flat highly polished surface is most desirable and it may be found advantageous to provide means for repolishing the moving surfaces after use. For the production of a matt finish on the sheet, a rough surface may be employed.

Many useful and beautiful effects are produced by employing moving surfaces which are contoured. Thus they may be engraved, or coated with a pattern, for example, of polythene. Sheets produced between such surfaces could be employed for a variety of decorative purposes such as the production of bathroom tiles. By employing corrugated surfaces, a simple single stage process becomes available for the production of transparent corrugated plastic sheets which may be used among other purposes for the construction of roof lights. It is possible to produce many of the above effects by passage of continuous plane sheets, manufactured in accordance with the present invention, between heated rolls, said rolls bearing upon their surfaces a negative of the required effect produced, for example, by machining or coating. If desired, textiles or paper in either a plain form or bearing printed designs may be run into the nip of the bands simultaneously with the polymerisable material so that these materials are embedded in the polymerised sheet. The process described in British application No. 5,957/43 may also be applied according to this invention for the production of polymeric resin sheets bearing relief images.

In a particular form of the process of this invention two parallel, flexible, compressible gaskets are set between the two moving surfaces and move at the same rate and prohibit the lateral spreading of the polymerising material under the influence of applied pressure. These gaskets may also be continuous.

A suitable form of the apparatus is illustrated in the diagrams accompanying the provisional specification.

Figure 2:
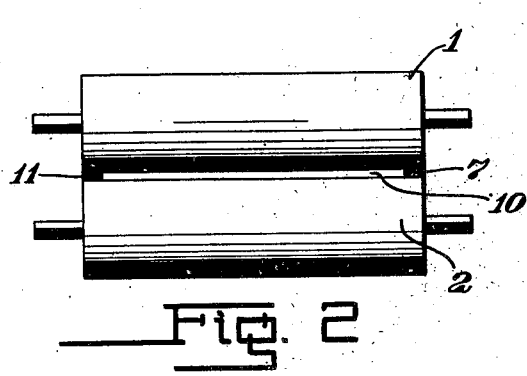

Figure 1 and Figure 2 depict respectively side and end elevation of the apparatus, the end elevation being the section AB illustrated in Figure 1.

1, 2, 3 and 4 are wide drums of equal radius, 1 and 2 being driven at equal speed and opposite direction. 5 and 6 are continuous flexible metal bands and form the moving surfaces of this invention. The distance these bands are apart controls the thickness of the sheet produced. 7 and 11 are continuous flexible rubber gaskets which circumscribe the edges of the metal band 6. The distance these gaskets are apart controls the width of the sheets produced but this must be less than the width of the bands.

8 is a spreader set to ensure a steady supply of the polymerisable material to the nip beneath the drum 3.

9 is an electrically heated oven enclosing the portion of the moving bands between which polymerisation is taking place.

10 is a portion of the polymerised sheet.

This invention is particularly suited for the production of sheets or plates of polymethyl methacrylate compositions which have very useful physical and chemical properties. The following example of the production of sheets of polymethyl methacrylate is given in order further to illustrate how this invention may be carried out in practice.

Example

The apparatus used was similar to the one illustrated in Figures 1 and 2 except that a non-continuous gasket was used. The diameters of the drums 1, 2, 3 and 4 were each 18 inches. Drum 1 was vertically above drum 2 and the distances between the centres of drums 1 and 2 and 2 and 4 were 7 ft. 6 ins. and 9 ft. respectively. The widths of the continuous flexible steel bands 5 and 6 were 9 ins. The oven, 9, which extended a length of 5 ft. along the bands, was heated by means of banks of tubes supplied with low pressure steam. In order to ensure easy removal of the sheets of polymethyl methacrylate from the apparatus, the bands were covered with wet "Cellophane" (registered trade-mark) which overlapped both sides of the bands and was stuck to the backs of the bands by means of adhesive tape. The "Cellophane" (registered trade-mark) was then allowed to dry and become taut.

Two square cross-sectional lengths of flexible material of the type sold under the trade name of T grade "Welvic" (registered trade-mark) and which were sufficiently thick to be just nipped by the flexible steel bands were coiled on reels and set so that they could be fed into the apparatus between drums 3 and 4 and at either edge of the bands. 9 ins. of one of these lengths was cut off and the ends of this "Welvic" strip fused to the ends of the lengths so that when fed into the apparatus this strip held the lengths apart and at the edges of the bands and also prevented the flow of liquids down the apparatus.

The bands were set $\frac{1}{8}$ in. apart and adjusted so that they were parallel when checked by means of a gap-setting tool. Steam was then supplied to the oven to obtain and maintain a temperature of 55° C. in the oven and the drums were set rotating at a rate of 0.225 rev./hour.

The said strip and lengths of "Welvic" (registered trade-mark) were fed into the apparatus between drums 3 and 4 and a viscous syrup containing—

100 parts by weight methyl methacrylate
6 parts by weight polymethyl methacrylate
0.12 part by weight benzoyl peroxide was continuously fed between the bands and the said lengths at a rate of 20.5 cubic inches per hour.

After the apparatus had been running for 7 hours the said "Welvic" strip followed by a sheet of polymethyl methacrylate emerged from between drums 1 and 2 of the apparatus. The said strip and lengths of "Welvic" (registered trade-mark) were seprated from the sheet, the strip cut from the lengths and the lengths coiled for re-use. Sheets 9 ft. wide and any desired length were obtained. They were transparent, free from porosity, substantially free from internal strain and of good surface finish.

It is to be understood that the process of this invention is in no way restricted to the form illustrated. Thus, for example, the parallel portions of the bands are not necessarily horizontal. It is possible to employ an apparatus in which these portions are vertical and of equal length, the polymerisable material being fed directly into the nip and the polymerised sheet taken off vertically downwards. An apparatus in which the parallel portions are set at any intermediate angle may also be used.

Having now particularly described and ascertained the nature of my said invention, and in what manner the same is to be performed, I declare that what I claim is:

1. The process of claim 8 in which the monomeric material contains at least one $CH_2=C<$ group.

2. The process of claim 8 in which the moving surfaces are metal and the compounds are polymerized by heat.

3. The process of claim 8 in which the monomeric compound is polymerized by the action of light rays and at least one of the moving surfaces is a translucent material.

4. The process of claim 8 in which at least one of the moving surfaces is a regenerated cellulose sheet.

5. The process of claim 8 in which the moving surfaces move continuously during polymerization.

6. The process of claim 8 in which a cationic wetting agent is applied to the moving surface.

7. The process of claim 8 in which the monomeric material is methyl methacrylate.

8. The process for preparing rigid sheets, plates, and the like substantially free from internal strains and stresses which comprises passing a monomeric compound between and in contact with two moving surfaces, passing said compound and surfaces through a region provided with polymerization promoting means whereby the compound is polymerized in said region, bringing said moving surfaces slightly closer together as they pass through said region, whereby contact between said compound and both said surfaces is maintained during the polymerization and consequent shrinking of the compound, and removing the resultant polymerized sheet from both said surfaces.

EDMOND GEORGE WILLIAMS.

REFERENCES CITED

The following references are of record in the file of this patent:

UNITED STATES PATENTS

| Number | Name | Date |
|---|---|---|
| 2,075,735 | Loomis | Mar. 30, 1937 |
| 2,154,639 | Rohm et al. | Apr. 18, 1939 |
| 2,183,520 | Van Derhoef | Dec. 19, 1939 |
| 2,268,611 | Mitchell | Jan. 6, 1942 |
| 2,316,274 | Mitchell | Apr. 13, 1943 |
| 2,345,013 | Soday | Mar. 28, 1944 |
| 2,353,717 | Francis | July 18, 1944 |
| 2,419,281 | Noble | Apr. 22, 1947 |